H. S. FRANK.
PROCESS OF MANUFACTURING PISTON RINGS.
APPLICATION FILED JULY 1, 1918.

1,353,576. Patented Sept. 21, 1920.

WITNESS.
Charles A. Becker.

INVENTOR
Harry S. Frank
BY Rippey & Kingsland
HIS ATTORNEYS

UNITED STATES PATENT OFFICE.

HARRY S. FRANK, OF ST. LOUIS, MISSOURI.

PROCESS OF MANUFACTURING PISTON-RINGS.

1,353,576.  Specification of Letters Patent.  Patented Sept. 21, 1920.

Application filed July 1, 1918. Serial No. 242,719.

*To all whom it may concern:*

Be it known that I, HARRY S. FRANK, a citizen of the United States, residing at the city of St. Louis and State of Missouri, have invented a new and useful Process of Manufacturing Piston-Rings, of which the following is a specification.

This invention relates to the art of manufacturing piston rings.

An object of the invention is to provide a novel mode of treatment for piston rings whereby the shape of annular rings may be changed so that when they are compressed within cylinders for which they are intended they will impart a uniform pressure against the cylinders throughout the circumference of the rings.

Another object of the invention is to provide a method of treatment for piston rings, whereby the shape of annular rings may be changed and the material set in the changed shape so that when the rings are under compression they will impart uniform outward pressure, thus forming an efficient seal with the walls of the cylinders in which the rings operate.

The invention may be best understood by reference to a machine for practising the invention, such machine being illustrated in the drawings, in which—

Figure 1:
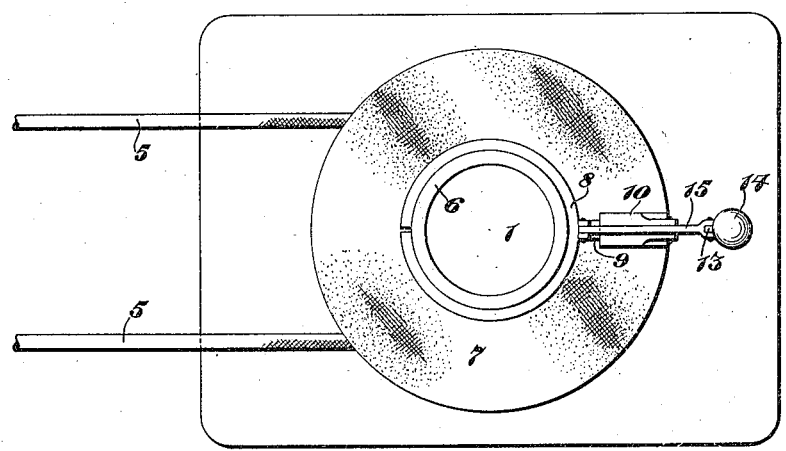
Figure 1 is a plan view of the machine.
Figure 2:
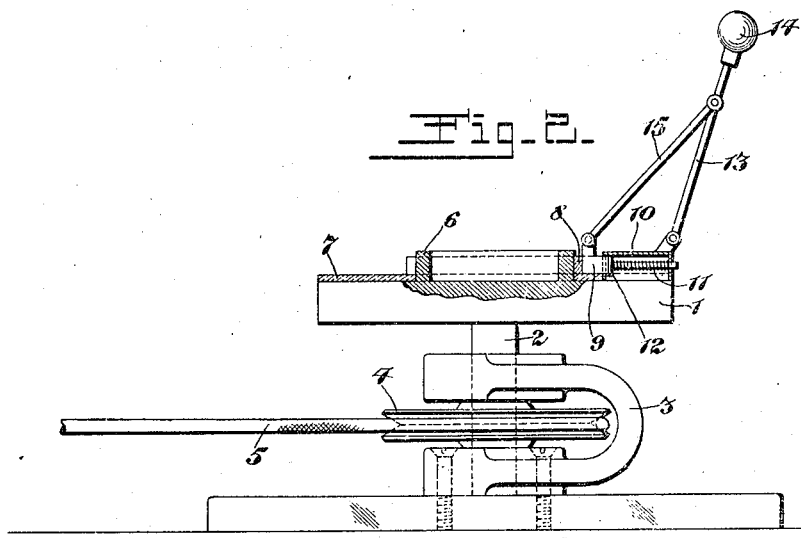
Fig. 2 is a side elevation with parts of the machine in section.

The machine illustrated for practising the invention constitutes the subject-matter of a separate application Serial No. 242,718, filed concurrently herewith, and includes a revoluble table 1 attached to the shaft 2 which is journaled in bearings in a bracket 3 and is rotated by driving connections including a pulley or sheave 4 and a belt or cable 5. An annular flange 6 is concentric with the table 1 and the axis of the shaft 2, and the top of the table is covered by a layer 7 of heat insulating material to prevent the table from being subjected to the direct influence of the heat by which the rings are treated and set in the shape given them by the rapid rotation of the table.

As shown a ring 8 is placed around the flange 6 and is thereby retained in a position which is concentric with the table 1 and the axis of the shaft 2. While in such position the driving mechanism is set in operation to revolve the shaft 2 and thereby the table 1 at a high rate of speed sufficient to create centrifugal force which will act upon the ring at all points through its circumference. The number of revolutions per minute, for instance, need not be counted with exactness. It is only necessary to rotate the support at a speed sufficient to create the centrifugal forces needed to modify the shape of the ring, and the speed of rotation required to create such centrifugal forces varies according to the degree to which the ring is heated; and the speed of rotation required also varies in the case of different materials. In treating any lot of rings the proper speed may readily be determined by placing one of the lot of rings on the machine and gradually increasing the speed of rotation until the desired results are attained and thereafter operating the machine at about the same rate of speed to treat all of the rings of the lot. In the case of gray cast iron, the rings having diameters of from three to five inches and from one-eighth to three-sixteenths of an inch in thickness are preferably heated to a cherry red and rotated at approximately seven hundred and fifty revolutions per minute, more or less. It may be found necessary, in some cases, to vary the speed of rotation as the character and thickness of the metal varies. The centrifugal forces thus acting upon the ring at all points throughout its circumference are sufficient to expand the ring and change the shape thereof, and while the ring is being revolved and while it is in its changed shape the ring is subjected to heat by which the molecular arrangement of the ring is modified or changed and the material is set in the changed shape. The ring may be heated before being placed on the table; or the table may be placed within a furnace or oven, or other heated place, and heat applied to the ring in that manner. This operation gives to the ring a shape such that when compressed within a cylinder the ring becomes perfectly round and imparts uniform pressure against the cylinder at all points throughout the circumference of the ring. The shape of the ring is changed by the centrifugal forces acting thereon imparting outward uniform radial pressure against the ring at all points throughout its circumference.

A retaining device may be employed in connection with the table in order to retain the ring properly in position thereon during the initial and final movements of the table in starting and stopping the same. The retaining device includes an element 9 radially movable within a case 10 and encircled by a spring 11, one end of which bears against the outer wall of the case and the other end of which bears against a collar or shoulder 12 on the member 9. Thus the member 9 is actuated inwardly into contact with the piston ring so that the piston ring is thereby retained in proper position during the initial and final movements of the table.

The centrifugal forces resulting from the rapid rotation of the table are also utilized to relieve the pressure of the device 9 from the piston ring. The device for this purpose comprises an actuator including an arm 13, having one end pivoted to the case 10 and provided with a weight 14 on its upper end, the arm 13 being connected with the member 9 by a link 15. As a result of this construction when the centrifugal forces created by the rotation of the table 1 reach a desired point, the member 9 is moved out of contact with the piston ring thus leaving the ring free to be affected at every point in its circumference by centrifugal forces created.

It will be understood that the specific construction of the machine for creating the centrifugal forces to modify and change the shape of the piston ring is unimportant and that the essence of the invention consists in subjecting the ring to uniform radial pressures at every point throughout the circumference of the ring by centrifugal force however created. Therefore, I do not confine myself to unessential limitations, but what I desire to claim is:—

1. The process of forming a piston ring, which consists in rotating the ring at a high rate of speed to change the shape thereof by centrifugal force, and treating the ring while rotating to change the molecular arrangement of the material of the ring to set the same in a changed shape.

2. The process of forming a piston ring, which consists in rotating a heated ring at a high rate of speed to subject the ring to centrifugal forces sufficient to change the shape of the ring and set the material thereof in its changed shape.

3. The process of forming a piston ring, which consists in rotating the ring at a high rate of speed sufficient to change the shape thereof by centrifugal force, and setting the material of the ring in the changed shape while the ring is in rotation.

4. The process of forming a piston ring, which consists in placing an open ring concentrically upon a rotatable support, rotating the support at a sufficient rate of speed to change the shape of the ring, and subjecting the ring to treatment to set the material thereof in the changed shape while the ring is in rotation.

HARRY S. FRANK.